United States Patent

Kubo et al.

[11] Patent Number: 5,124,182
[45] Date of Patent: Jun. 23, 1992

[54] METHOD FOR PREPARING A CLEAR COAT ON A CONCRETE SUBSTRATE

[75] Inventors: Shinji Kubo; Osamu Yamamoto, both of Kyoto, Japan

[73] Assignee: Nippon Paint Co., Ltd., Osaka, Japan

[21] Appl. No.: 592,538

[22] Filed: Oct. 1, 1990

[51] Int. Cl.$^5$ .............................................. B05D 3/02
[52] U.S. Cl. .............................. 427/393.6; 427/407.1; 428/540
[58] Field of Search ................... 427/393.6, 407.1; 428/540; 523/220, 223

[56] References Cited

U.S. PATENT DOCUMENTS 3,670,047  6/1972  Broecker ........................ 528/112
5,013,768  5/1991  Kiriyama et al. ............... 523/300

FOREIGN PATENT DOCUMENTS 515643   8/1955  Canada ........................... 427/407.1
63-100987 5/1988  Japan ............................ 427/407.1

Primary Examiner—Michael Lusignan
Assistant Examiner—Terry J. Owens
Attorney, Agent, or Firm—Wenderroth, Lind & Ponack

[57] ABSTRACT

A method for preparing a clear under coat on a concrete substrate by applying onto a coating composition comprising a solvent type synthetic resin varnish and organic or inorganic pigment microparticles having an average diameter of 5 μ or less uniformly dispersed in the varnish in an amount which is enough to give a pigment volume concentration of 5 to 50, the difference in mean refractive index of the microparticles and synthetic resin being 0.01–0.40.

3 Claims, No Drawings

METHOD FOR PREPARING A CLEAR COAT ON A CONCRETE SUBSTRATE

FIELD OF INVENTION

The present invention relates to a method for preparing a clear undercoat on a porous material and especially a concrete and more specifically, it concerns a method for preparing a clear undercoat on a concrete substrate; the undercoat providing a durable, clear and effective protecting coating for the concrete substrate.

BACKGROUND OF THE INVENTION

Recently, in the building industry, attention has been directed to use, as a finishing material, applied concrete itself, pre-casting concrete, a hollow extrusion-molded concrete plate and the like.

However, such material has serious problems in that it is easily turned to a darker color by rain water and stained by air pollutants, thereby spoiling the original good appearance.

To cope with the same, various attempts have been made to produce an effective, clear protective coating.

However, in such method of coating a concrete surface several times with a clear coating composition comprising a resinous varnish obtained by diluting a synthetic resin with an organic solvent and combined with various additives as a defoaming agent and the like, one cannot attain the desired object of obviating the darker color because the concrete color is darkened by the applied coating composition. Moreover, there arises a new question of turning to a different material as a finish because the applied coating composition has the effect of strengthening the shade of color of the concrete having a heterogeneous composition.

Even if there is used a slightly colored clear coating composition added with a small amount of coloring pigment to offset the darkened color in place of the clear coating composition, it does not completely cover the substrate material, and there still results the problem of darker color; hence, one is unable to make the most of the original feel and appearance of the concrete.

When a water diluted, synthetic resin emulsion composition is applied by a coating technique on a concrete surface, differing from the above-mentioned solvent type coating composition, to alleviate the darker color problem, such composition is comparatively poor in adhesion to the concrete surface, often resulting in blistering and peeling of the applied coat. This is due to the action of rain water and the water contained in said concrete.

Attempts have also been made to coat or to impregnate concrete with a penetrable water repellent as an alkyl alkoxy silane and the like. However, such material is gradually dissolved out of and removed from the concrete and its activity can be only expected for at most 2 years.

It has also been proposed to first coat or impregnate the concrete with a water repellent, such as alkyl alkoxy silane and the like and then apply a solvent type clear coating composition thereupon; however, in this case, there is a problem of the generation of a darker color.

Thus, none of the proposed methods have solved the above-mentioned problems.

It is, therefore, an object of the invention to provide a method for preparing a clear coat on a concrete surface, without causing any loss in the quality and material feeling of the concrete and capable of effectively preventing the generation of this darker color and which is excellent in adhesion and durability.

SUMMARY OF THE INVENTION

According to the invention, the above-mentioned object of the present invention can be attained by a method for preparing a clear undercoat on a concrete substrate, which comprises applying onto the concrete substrate, a coating composition comprising a solvent type synthetic resin varnish, and organic or inorganic microparticles having an average diameter of 5 $\mu$ or less uniformly dispersed in said varnish in an amount which is sufficient to produce a pigment volume concentration of 5 to 50, the difference in mean refractive index of said microparticles and said synthetic resin being 0.08–0.40.

The term "darker color" as used herein means that the light surface of concrete becomes darker because of the moisture content when contacted with moisture.

In this invention, a conventional solvent type synthetic resin varnish for concrete use is advantageously used.

Examples of such resins are acryl resins, vinyl resins and the like as one liquid type resinous varnish; and acryl urethane resins, fluorine resins, acryl silicone resins and the like as two liquid type resinous varnishes.

Other examples are non-aqueous dispersion type vinyl resins and the like.

However, such resins as alkyd resins and chlorinated polypropylene are unsuitable because they are affected with the alkali substance coming from concrete.

The above-mentioned synthetic resins, excluding alkyd resins and chlorinated polypropylene resins, are advantageously used in the form of solution or dispersion in an organic solvent.

In this invention, to the above-mentioned resinous varnish, there is uniformly added organic or inorganic microparticles having an available grain diameter of 5 $\mu$ or less, whose mean refractive index differs from the refractive index of said synthetic resin to the extent of 0.08–0.40 so as to give a particle volume concentration (i.e. pigment volume concentration) represented by the equation:

$$\text{Particle volume concentration} = \frac{\text{volume of particles}}{\text{volume of particles} + \text{volume of synth. resin}} \times 100$$

of 5–50 and the thus obtained coating composition is applied onto a concrete surface as an undercoat.

Examples of microparticles as used in the present invention are body pigments, such as precipitated barium sulfate, calcium carbonate, clay, talc and the like; matting agents, such as silicic acid micropowder and the like; microparticles of such polymers as polystyrene, polystyrene-methyl methacrylate, polyurethane and the like; and white pigments, such as titanium oxide, zinc oxide and the like.

However, the invention is not limited to the above-mentioned microparticles and any of the organic or inorganic microparticles showing a refractive index difference of 0.08–0.40, preferably 0.10–0.13 between the average refractive index of said microparticles and the refractive index of synthetic resin, may be satisfactorily used in this invention.

The microparticles may be of single material or may be used in the combination of two or more different type of microparticles.

The term "average refractive index" as used herein shall mean $$\sum_{i=1}^{n} a_i n_i$$

in which $n_i$ represents the refractive index of microparticle i and $a_i$ means the volume fraction of microparticle i.

If the refractive index difference between the average refractive index of particles or combination of particles and the refractive index of the synthetic resin is less than 0.08, there is a shortage of scattered-light volume, resulting in a darker color due to the deficient whitening effect of the microparticles, whereas if the refractive index difference exceeds 0.40, there is an excessive scattered-light volume, resulting in an undesirable opaque coating.

It is also essential that the average diameter of said microparticles should be 5 $\mu$ or less, and most preferably 0.05 to 4$\mu$.

If the average diameter is more than 5$\mu$, there is a tendency that darker color protection activity will be lowered and that particle precipitation will occur during storage and during coating with a coating composition, which will adversely affect the adhesion properties of the formed coating.

It is likewise confirmed that the diameter of the microparticles used should preferably be as small as possible, since the desired object and effect, i.e. prevention of darker color, can be better attained with a much smaller quantity of such microparticles.

The microparticles should be compounded with the resin varnish so as to give a particle volume concentration (PVC) represented by the equation $$PVC = \frac{\text{particle volume}}{\text{particle volume} + \text{resin volume}} \times 100$$

If the PVC is less than 5, there is a tendency that darker color will be easily generated because of excessive penetration of the synthetic resin into the concrete, whereas if it exceeds 50, there results in an unsatisfactory adhesion of the resin coating on the concrete due to the deficient penetration of the resin into the concrete.

Furthermore, since such an amount of microparticles results in the scattering of light impinging upon the coating, such that an undesirable opaque coating is produced.

A particularly preferable PVC range is 10–30.

To the present concrete undercoat composition, various additives, such as particle anti-settling agents, anti-foaming agents and the like may be added as desired.

No particular technique is required for the preparation of the present undercoat composition and any of the known convention techniques may be satisfactorily used.

For example, a part of a synthetic resin and an organic solvent are uniformly mixed in a disper. To this, all of the microparticles and anti-settling agents are added and dispersed well in an SG mill.

To the thus obtained dispersion, the remaining amount of synthetic resin, organic solvent and other optional additives as anti-foaming agents are added and the combined composition is mixed and stirred well in a disper to obtain the present coating composition. In this invention, the thus obtained coating composition is directly applied on a concrete surface as an undercoat, dried and cured.

Usually, such undercoat is applied two or three times.

However, in a most preferable embodiment, the above-mentioned undercoat is applied only once or twice and then a topcoat composition is applied thereon, to obtain a coating with excellent weather resistance and appearance (e.g. gloss) and the like.

As the topcoat paint, either a glossy paint comprising a uniform mixture of a synthetic resin, such as an acrylic resin, an acryl-urethane resin, a acryl silicone resin, a fluorine resin and the like, solvents and anti-foaming agents or a flat paint comprising the above-mentioned uniform mixture together with body pigments, flatting agents, polymer particles or the like are added.

In an actual application of these undercoat and top-coat compositions, after diluting each composition with an appropriate solvent to an appropriate viscosity (e.g. NK#2 Cup. 10–30 seconds), the diluted undercoat composition is first applied by air-spraying, airless spraying, or wool roller coating means, the coat is allowed to stand and dry for about 4 hours, and the diluted top coat composition is then applied by means of air spraying, airless spraying or wool roller coating.

Even when a multicoat coating of a topcoat composition composition is required, it is preferred to carry out the coatings at 4 hour intervals.

If desired, an impregnating repellent, such as alkoxysilane and the like may be applied onto the concrete before the undercoat application, thereby attaining sure prevention of the darker color due to the action of water contained in concrete.

The above-mentioned under- and upper-coat paints each is applied in general, in amounts of about 100 to 200 g/m$^2$, but may be varied according to the desired objects and effects.

According to the method of this invention, the microparticles contained in the undercoat composition will serve to control the penetration depth of the synthetic resins contained in the undercoat and upper-coat compositions into the concrete, thereby limiting the generation of darker colors and furthermore, certain amounts of synthetic resin contained in the undercoat composition will penetrate into the concrete, thereby attaining an increase in the adhesion of the applied coat to the concrete substrate.

There is, indeed, a tendency for the concrete to be darkened due to the penetration of the synthetic resin, but since the scattered light amount of the coating is influenced by the light refractive indexes of said microparticles and synthetic resin, as well as the amount and average grain diameters of said microparticles, the concrete surface is somewhat whitened to offset any darkening of the coated concrete.

In view of the above, the differences in the average refractive index between the microparticles and the synthetic resin, and the particle volume concentration and average diameter of said microparticles are very important in this invention.

If the average diameter of the microparticles exceeds the defined upper limit, one cannot seal the concrete pores and hence the resin will penetrate excessively into the concrete, resulting in an undesirable darker color.

Thus, in the present invention, it is possible to provide a clear undercoat on a concrete, having a long lasting darker color preventing effect, and through the combined use with an appropriate topcoat, it is possible to provide a durable clear coat which is effective in making the most of material feel and quality feel of the concrete.

The invention has been explained minutely in connection with a concrete substrate, but the invention is not limited to application on a concrete substrate, and any of the porous materials may be satisfactorily used as a substrate.

The invention shall be more fully explained in the following Examples.

Unless otherwise being stated, all parts and percentages are by weight.

EXAMPLE 1

To 114.4 parts of acryl polyol varnish (refractive index of synthetic resin 1.51), 45.8 parts of xylene was added and the combined materials were mixed well in a disper.

To this, 8.6 parts of rutile type titanium oxide (average grain diameter $0.2\mu$, refractive index 2.72), 134 parts of calcium carbonate (1) (average grain diameter $1.3\mu$, refractive index 1.57) and 4.5 parts of polyethylene oxide anti-settling agent was added and the combined materials were dispersed in an SG mill.

To 307.3 parts of thus obtained dispersion paste, 546.6 parts of the same acryl polyol varnish as used herein before, 114.1 parts of xylene and 32 parts of butyl acetate were added and the combined composition was uniformly mixed in a disper to obtain a coating composition.

1,000 parts of the above-mentioned composition and 68.8 parts of SUMIDUL N-75 (HMDI prepolymer prepared by Sumitomo Bayer) were combined together to give an undercoat paint.

To 1068.8 parts of this paint, were added 30 parts of a thinner (xylene/butyl acetate = 7/3) to adjust the viscosity of the paint to NK#2 Cup 18 seconds.

The thus-diluted paint was then applied by an air-spray gun (W-88-10E-5S, manufactured by Iwata Tosohki K.K.) onto a concrete substrate (coating amount 140 g/m$^2$).

After 16 hours later, DUFRON CLEAR (a fluorine resin base clear coating composition, manufactured by Nippon Paint Co.) was applied twice each in 4 hours interval time by using the same spray gun (coating amount each 120 g/m$^2$).

The particle volume concentration (hereinafter referred to PVC) of this undercoat composition was 13.1 and the refractive index difference between the microparticles and the synthetic resin (hereinafter referred to $\Delta n$) was 0.10.

The acryl polyol used was a 49% solution of acryl polyol having an average molecular weight of 8,000 and a hydroxyl value of 46.

The refractive index of the above-mentioned clear coat was 1.51.

EXAMPLE 2

The similar procedures as stated in Example 1 were repeated except for substituting calcium carbonate 2 having an average grain diameter of $0.07\mu$ and a refractive index of 1.57 for calcium carbonate 1.

EXAMPLE 3

The similar procedures as stated in Example 1 were repeated except for increasing the amount of rutile type titanium oxide to 12.8 parts and substituting 55.9 parts of polystyrene particles (average grain diameter $0.07\mu$, refractive index 1.54) for the calcium carbonate (1).

EXAMPLE 4

To 305.2 parts of acryl polyol varnish (refractive index 1.51), was added 99.0 parts of xylene and 23.3 parts of butyl acetate and the combined materials were uniformly mixed in a disper.

To this, was added 380.6 parts of precipitated barium sulfate (1) (average grain diameter $0.6\mu$, refractive index 1.64) and 3.2 parts of a polyethylene oxide anti-settling agent and mixed well.

The mixture was dispersed in an SG mill and to the thus-obtained dispersion paste, was added 172.2 parts of the above-mentioned acryl polyol varnish and 16.5 parts of xylene and the combined materials were uniformly mixed in a disper to obtain 1,000 parts of a coating composition.

49.7 parts of SUMIDUL N-75 and 350.0 parts of thinner were then added to obtain an undercoat composition.

The similar procedures as stated in Example 1 were repeated with thus-obtained undercoat composition.

EXAMPLE 5

To 290.6 parts of acryl polyol varnish (refractive index 1.51), was added 55.6 parts of xylene and 17.1 parts of butyl acetate and the mixture was uniformly mixed in a disper.

To this, was added 536.3 parts of precipitated barium sulfate (2) (average grain diameter $4.02\mu$, refractive index 1.64), 8.6 parts of a rutile type titanium oxide and 2.3 parts of a polyethylene oxide anti-settling agent and mixed well.

The mixture was dispersed in an SG mill and to the thus-obtained dispersion paste, was added 60.2 parts of the above-mentioned acryl polyol varnish and 29.3 parts of xylene and the composition was uniformly mixed in a disper to obtain 1,000 parts of coating composition.

36.5 parts of SUMIDUL N-75 and 300.0 parts of thinner was then added to obtain and undercoat composition.

The similar procedures as stated in Example 1 were repeated with thus-obtained undercoat composition.

EXAMPLE 6

To 62.0 parts of acryl polyol varnish (refractive index 1.51), was added 31.1 parts of xylene and the mixture was uniformly mixed in a disper.

To this, was added 56.3 parts of the calcium carbonate (2) of Example 2, 21.9 parts of rutile type titanium oxide and 5.2 parts of a polyethylene oxide anti-settling agent and mixed well.

The mixture was dispersed in an SG mill, and to the thus-obtained dispersion paste, was added 609.7 parts of the above-mentioned acryl polyol varnish, 172.8 parts of xylene, and 41.0 parts of butyl acetate and the composition was uniformly mixed in a disper to obtain 1,000 parts of a coating composition.

69.9 parts of SUMIDUL N-75 and 330.0 parts of thinner was then added to obtain an undercoat composition.

The similar procedures as stated in Example 1 were repeated with thus-obtained undercoat composition.

EXAMPLE 7

The same procedures as stated in Example 6 were repeated.

However, in this Example, the concrete surface was precoated with an alkyl alkoxy type water repellent aqueous impregnation agent (TAFGARD E impregnation agent, manufactured by Nippon Paint Co.) and the undercoat composition was applied thereon after permitting 4 hours to elapse from the application of said impregnation agent.

EXAMPLE 8

The same procedures as stated in Example 1 were repeated except for using as an upper-coat composition a 3 minutes glossy paint (DUFRON Clear 3 MINUTES, manufactured by Nippon Pain Co.)

EXAMPLES 9-10

According to the procedures of Example 1, undercoat paints having the compositions hereinunder mentioned were prepared and they were applied as in Example 1.

EXAMPLE 9

| Dispersion Paste | |
|---|---|
| CORPONEEL 9079* | 150 |
| rutile type titanium oxide | 7.9 |
| calcium carbonate (1) | 123.0 |
| xylene | 70.1 |
| Undercoat paint | |
| The above-mentioned dispersion paste | 351.0 |
| CORPONEEL 9079 | 526 |
| xylene | 40 |
| toluene | 55 |
| isobutanol | 28 |
| thinner | 1600 |

*Nihon Gosei Kagaku Kogyo K.K. Solvent type vinyl resin (vinyl acetate/methyl methacrylate = 6/4)

EXAMPLE 10

| Dispersion paste | |
|---|---|
| NISSETSU U-3367** | 200 |
| rutile type titanium oxide | 7.9 |
| calcium carbonate (1) | 123.0 |
| mineral turpen | 50 |

| -continued | |
|---|---|
| Undercoat paint | |
| The above-mentioned dispersion paste | 380.9 |
| NISSETSU U-3367 | 493 |
| mineral spirit | 70.4 |
| thinner | 1400 |

**Nihon Carbide Kogyo K.K. non-aqueous dispersion type vinyl resin (methyl methacrylate/butyl acrylate = 7/3)

COMPARATIVE EXAMPLES 1-5

Using the materials shown in Table 1, undercoat paints were prepared as in Example 1 and diluted with thinner (butyl acetate/xylene=3/7) to NK#2 Cup 18 seconds.

The thus-diluted undercoat compositions were used as in Example 1.

TABLE 1

| | Comparative Example | | | | | |
|---|---|---|---|---|---|---|
| | 1 | 2 | 3 | 4 | 5 | 6 |
| acryl polyol varnish | 386.4 | 665.0 | 651.0 | 749.0 | 233.8 | acryl emulsion = 100 |
| rutile type titanium oxide | 23.6 | | 64.1 | 2.0 | | water = 100 |
| calcium carbonate (1) | | 142.0 | 96.1 | 31.5 | | silicone type defoaming agent = 0.01 |
| precipitated barium sulfate (2) | | | | | 630.6 | |
| calcium carbonate (3) | 367.7 | | | | | |
| butyl acetate | 65.9 | 58.0 | 56.6 | 65.0 | 40.9 | |
| xylene | 156.4 | 135.0 | 132.2 | 152.5 | 94.7 | |
| polyethylene oxide anti-settling agent | 5.0 | 2.0 | 2.0 | 2.0 | 5.0 | |
| SUMIDUL N-75 | 40.1 | 69.0 | 67.4 | 77.0 | 24.7 | |

COMPARATIVE EXAMPLE 6

100 parts of an acryl polymer emulsion (average diameter 0.1$\mu$, refractive index of synthetic resin 1.50), parts of water and 0.01 part of silicone type defoaming agent were mixed well and diluted with a thinner to a viscosity of NK#2 Cup 14 seconds.

The thus-obtained diluted paint was applied as in Example 1.

The properties of the thus-obtained coatings were evaluated a follows:

Darker Color preventive property

◯ . . . color difference between the coated concrete and uncoated concrete is very small and the coated color is very similar to that of uncoated concrete X . . . coated cOncrete color is very dark as compared with the color of uncoated concrete Transparency ◯ . . . transparency of the coat is excellent and original shade of color of concrete is obtained X . . . original shade of color of concrete cannot be obtained because of excessive hiding power of the coat Adhesion property 603 . . . peel off is less than 5% in tape test X . . . peel off is more than 50%

The test results were shown in Table 2.

TABLE 2

| | | Example 1 | Example 2 | Example 3 | Example 4 | Example 5 |
|---|---|---|---|---|---|---|
| under coat | synthetic resin | acryl urethane (solution) | acryl urethane (solution) | acryl urethane (solution) | acryl urethane (solution) | acryl urethane (solution) |
| | average diameter of microparticles | >1.26$\mu$ | 0.07 | 0.07 | 0.60 | 4.02 |
| | PVC | 13.1 | 13.1 | 13.1 | 26.4 | 41.1 |

TABLE 2-continued

|  | | | | | | |
|---|---|---|---|---|---|---|
| | Δn | 0.10 | 0.10 | 0.10 | 0.13 | 0.15 |
| Upper coat | | DUFRON clear | DURFRON flat paint | DUFRON clear | DUFRON clear | DUFRON clear |
| impregnation agent | | no | no | no | no | no |
| Darker-color prevention | | ◯ | ◯ | ◯ | ◯ | ◯ |
| transparency | | ◯ | ◯ | ◯ | ◯ | ◯ |
| adhesion property | | ◯ | ◯ | ◯ | ◯ | ◯ |

| | | Example 6 | Example 7 | Example 8 | Example 9 | Example 10 | Comp. Ex. 1 |
|---|---|---|---|---|---|---|---|
| under coat | synthetic resin | acryl urethane (solution) | acryl urethane (solution) | acryl urethane (solution) | acryl (solution) | acryl (NAP) | acryl urethane (solution) |
| | average diameter of microparticles | 0.07μ | 1.26 | 1.26 | 1.26 | 1.26 | 8μ |
| | PVC | 7.0 | 13.1 | 13.1 | 13.1 | 13.1 | 41.1 |
| | Δn | 0.29 | 0.10 | 0.10 | 0.11 | 0.11 | 0.10 |
| Upper coat | | DUFRON clear | DUFRON clear | DUFRON clear 3 min. glory paint | DUFRON clear | DUFRON clear | DUFRON clear |
| impregnation | | no | yes | no | no | no | no |
| Darker-color prevention | | ◯ | ◯ | ◯ | ◯ | ◯ | X |
| transparency | | ◯ | ◯ | ◯ | ◯ | ◯ | ◯ |
| adhesion property | | ◯ | ◯ | ◯ | ◯ | ◯ | ◯ |

| | | | Comp. Ex. 2 | Comp. Ex. 3 | Comp. Ex. 4 | Comp. Ex. 5 | Comp. Ex. 6 |
|---|---|---|---|---|---|---|---|
| | under coat | synthetic resin | acryl urethane (solution) | acryl urethane (solution) | acryl urethane (solution) | acryl urethane (solution) | acryl (emulsion) |
| | | average diameter of microparticles | 1.30 | 1.30 | 0.07 | 4.02 | — |
| | | PVC | 13.1 | 13.1 | 3.0 | 55 | — |
| | | Δn | 0.66 | 0.45 | 0.10 | 0.13 | — |
| | Upper coat | | DUFRON clear | DUFRON clear | DUFRON clear | DUFRON clear | DUFRON clear |
| | impregnation agent | | no | no | no | no | no |
| | Darker-color prevention | | X | ◯ | X | ◯ | ◯ |
| | transparency | | ◯ | X | ◯ | X | ◯ |
| | adhesion property | | ◯ | ◯ | ◯ | ◯ | X |

What is claimed is:

1. A method for preparing a clear undercoat on a concrete substrate which comprises applying onto a concrete substrate a coating composition consisting essentially of a synthetic resin varnish, microparticles of an inorganic pigment or an organic plastic pigment having an average diameter of 5μ or less and uniformly dispersed in said varnish to give a pigment volume concentration of 5 to 50, wherein the difference in mean refractive index of said microparticles and the synthetic resin in said synthetic resin varnish is 0.08–0.40, and said pigment volume concentration is calculated from the following formula: Pigment volume concentration=

$$\frac{\text{microparticle volume}}{\text{microparticle volume} + \text{synthetic resin volume}} \times 100.$$

2. A method according to claim 1, wherein the synthetic resin is selected from the group consisting of an acrylurethane resin, a fluorine resin and a silicon resin.

3. A method according to claim 1, wherein the coating composition is such that the synthetic resin varnish composition consists of 100 parts by volume of said synthetic resin and up to 500 parts by volume of a solvent, and the microparticles are present in an amount of 5.26 to 100 parts by weight.

* * * * *